(12) United States Patent
Nagano

(10) Patent No.: US 8,532,615 B2
(45) Date of Patent: Sep. 10, 2013

(54) BASE STATION AND MOBILE TERMINAL

(75) Inventor: Hajime Nagano, Yokohama (JP)

(73) Assignee: Kyocera Corporation, Kyoto (JP)

( * ) Notice: Subject to any disclaimer, the term of this patent is extended or adjusted under 35 U.S.C. 154(b) by 389 days.

(21) Appl. No.: 12/395,445

(22) Filed: Feb. 27, 2009

(65) Prior Publication Data

US 2010/0015948 A1    Jan. 21, 2010

(30) Foreign Application Priority Data

Feb. 27, 2008  (JP) ................................. 2008-045875

(51) Int. Cl.
*H04M 1/66* (2006.01)

(52) U.S. Cl.
USPC ............ 455/410; 340/5.3; 340/531; 340/541; 455/411

(58) Field of Classification Search
USPC ..... 455/435.1, 410, 422.1, 411; 340/5.1–5.3, 340/545.1, 541–567, 531
See application file for complete search history.

(56) References Cited

U.S. PATENT DOCUMENTS

| | | | |
|---|---|---|---|
| 6,624,739 B1 * | 9/2003 | Stobbe ........................... | 340/5.2 |
| 7,053,768 B2 | 5/2006 | Seshadri | |
| 7,349,682 B1 * | 3/2008 | Bennett et al. ................ | 455/403 |
| 2002/0099945 A1 * | 7/2002 | McLintock et al. .......... | 713/186 |
| 2003/0184436 A1 * | 10/2003 | Seales et al. .................. | 340/531 |
| 2004/0085202 A1 * | 5/2004 | Naidoo et al. ................ | 340/531 |
| 2005/0086366 A1 * | 4/2005 | Luebke et al. ................ | 709/238 |
| 2005/0262519 A1 * | 11/2005 | Luebke et al. ................ | 719/318 |
| 2006/0183460 A1 * | 8/2006 | Srinivasan et al. ........... | 455/410 |
| 2006/0252371 A1 * | 11/2006 | Yanagida ..................... | 455/41.1 |

(Continued)

FOREIGN PATENT DOCUMENTS

| | | |
|---|---|---|
| JP | 01-154636 A | 6/1989 |
| JP | 01-163890 | 6/1989 |

(Continued)

OTHER PUBLICATIONS

Office Action from Japanese Patent Application No. 2008-045875, mailed on Apr. 20, 2010, 2 pages.

(Continued)

*Primary Examiner* — Jinsong Hu
*Assistant Examiner* — Nathan Taylor
(74) *Attorney, Agent, or Firm* — Duane Morris LLP

(57) ABSTRACT

To provide a security technique (a base station and a mobile terminal) for easily guarding a building such as a house for an average family or a small office at a low price by using a cellular phone terminal and a small base station (femtocell). A base station (FCL) of a mobile communication system placed in a building includes a communication unit (140) for communicating with the mobile communication system via a communication line; an obtaining unit (123) for obtaining an opened state of a fitting set to an opening of the building from the fitting or a switch placed near the fitting for detecting the opened state of the fitting; a registering unit (121) for registering information on a mobile terminal that uses the base station; a processing unit (122) for processing location registration of the mobile terminal; and a control unit (120) for controlling the communication unit to transmit a predetermined message to a predetermined addressee via the communication line if information received from the mobile terminal does not match the information registered in the registering unit when the location registration of the mobile terminal is performed by the processing unit after the opened state of the fitting is obtained.

5 Claims, 12 Drawing Sheets

(56) References Cited

U.S. PATENT DOCUMENTS

| | | |
|---|---|---|
| 2007/0052518 A1 | 3/2007 | Nakamura |
| 2007/0132546 A1* | 6/2007 | Nakamura et al. ............. 340/5.3 |
| 2008/0261596 A1* | 10/2008 | Khetawat et al. ............. 455/436 |
| 2009/0264155 A1 | 10/2009 | Nakayama et al. |

FOREIGN PATENT DOCUMENTS

| | | |
|---|---|---|
| JP | 09-154167 | 6/1997 |
| JP | 11-122676 | 4/1999 |
| JP | 2001-202581 | 7/2001 |
| JP | 2002-352363 | 6/2002 |
| JP | 2003-224505 | 8/2003 |
| JP | 2004-355215 | 12/2004 |
| JP | 2005-031831 | 2/2005 |
| JP | 2005-109570 | 4/2005 |
| JP | 2006-303736 | 11/2006 |
| JP | 2007-034911 | 2/2007 |
| JP | 2007-134881 | 5/2007 |
| JP | 2008-027432 | 2/2008 |

OTHER PUBLICATIONS

JP 2008-074075 Office Action mailed Apr. 27, 2010, 2 pages.
U.S. Appl. No. 12/408,626 Final Office Action mailed Oct. 11, 2012.
JP 2010-141051 JP Office Action dated Aug. 15, 2012.
Notification of Reason for Refusal (translation) for JP 2010-141051, mailed Apr. 10, 2012, 2 pages.
Office Action issued Jun. 18, 2013 in corresponding Japanese Patent Application No. 2010-141051, 6 pages.

* cited by examiner

FIG. 3

| FEMTOCELL AP NUMBER : 1234 (ADDRESS : ABC) CONNECTABLE TERMINAL ||||| 
|---|---|---|---|---|
| | TERMINAL ID | CELLULAR PHONE NUMBER | CONTRACTOR NAME | MODEL |
| AT1 | XXXX1 | 090-XXXX-0000 | TARO YAMADA | 51K |
| AT2 | XXXX2 | 090-XXXX-0001 | TARO YAMADA | 52K |

TB1

BASE STATION AND MOBILE TERMINAL

CROSS REFERENCE TO RELATED APPLICATION

The present application is based upon and claims the benefit of priority from the prior Japanese Patent Application No. 2008-045875 (filed on Feb. 27, 2008); the entire contents of which are incorporated herein by reference.

TECHNICAL FIELD

The present invention relates to a base station and a mobile terminal, and more specifically to a base station and a mobile terminal that function as a security apparatus by using communication functions thereof.

BACKGROUND ART

It has been planned to set a small base station for cellular wireless terminals (cellular phones) in each house or the like that is outside a service range or in a weak electric field as it is at an upper floor of a high-rise building or at a basement or has a high-rise building or the like around (hereinafter, the base station is referred to as "femtocell"). The femtocell is adapted to be used as being connected to a cellular phone network via the Internet by being connected to a broadband line installed at each home such as ADSL or FTTH.

The law currently in force in Japan, however, takes that small base station as a public base station, and therefore, requires a license to be applied for the small base station as for a general wide area base station. In addition, for the small base station, many restrictions such as it takes one to two months for the license to be given from the application, only the cellular phone company can set the small base station, the set place is not allowed to be moved, the small base station is not allowed to be switched off, a no-break power unit is required, and the like are posed for the small base station.

On the other hand, Ministry of Internal Affairs and Communications is planning to ease the restrictions so as to make high-rise buildings, underground markets, houses in mountainous regions, and the like that are currently inaccessible to radio waves accessible to the radio waves in the summer of 2008. When the restrictions will be eased accordingly, the use of the femtocell as a home station will be considered as some cellular phone companies have been announcing in their business plans.

In addition, a human body communication technique has been realized (see Japanese Patent Application Laid-Open Publication No. 2006-303736). Some manufacturers are developing headsets using the human body communication. As such, the human body communication technique may be widely used in cellular phones instead of Bluetooth or the like.

Some services currently provided by security companies are such that if any one of fittings such as a door, a window, and the like that are fitted to the guarded opening is broken or opened, that is reported to the security company and a security guard is urgently sent to the site. As the charge, if the security apparatus is rent, the rental of 10,000 yen or so per month on average plus the guard fee, installation fee and the like, for example, are asked. If the security apparatus is purchased, the monthly expenditure is lowered to several thousand yen but the security apparatus may cost as high as several hundred thousand yen.

Safety, in which security against general risks such as burglary, gas leakage and fire is ensured and in case of such risks, a security guard is urgently sent to the site, is acquired in exchange for money. That case also has a problem of high expenditure.

Under the circumstances of security businesses, some security systems have been proposed in which an end user or an administrator guards a user by using not a security guard but rapidly prevailed cellular phones. For example, a security apparatus according to a conventional art using radio communication is proposed (see Japanese Patent Application Laid-Open Publication No. 2001-202581). FIG. 11 shows a block diagram of the security system according to the conventional art. According to the conventional art, a main control unit in a controlled area in which security is required can monitor the states of apparatuses (lights, keys) in the controlled area and can also obtain positional information of the administrator's cellular terminal from the mobile communications network. In that configuration, when the cellular terminal is outside the controlled area (out of area) and the state of apparatus requires warning, the main control unit gives warning to the cellular terminal. Moreover, when the state of apparatus requires warning and the cellular terminal has left the controlled area, the main control unit gives warning to the mobile terminal. Further, the main control unit has apparatus control means for controlling apparatuses to be in predetermined states according to location determination results of the cellular terminal.

A security technique for causing a mobile station dedicated to a particular area to perform location registration and warn a user not to leave the area with the dedicated mobile station when the dedicated mobile station leaves the area covered by a base station dedicated to the area in a system including the dedicated base station and the dedicated mobile station (see Japanese Patent Application Laid-Open Publication No. H11-122676). FIG. 12 shows a block diagram of the security system according to the conventional art.

SUMMARY OF INVENTION

Technical Problem

The conventional art shown in FIG. 11 can detect information that a door in the controlled area is opened while the administrator, i.e., the end user, is out, but has a problem in that the conventional art cannot determine whether it is an appropriate or normal action that needs no warning or not, i.e., whether the door is opened by an intruder or by a family member or an acquaintance of the family.

The conventional art shown in FIG. 12 is a system for monitoring only when the user leaves the area. Even if it were easily conceived that the conventional art also monitor when the user enters the area, as in the case of FIG. 11, the conventional art has a problem in that the conventional art has no consideration for a system to determine whether a person who enters the area is an appropriate person or inappropriate one.

Since each of the conventional arts shown in FIG. 11 and FIG. 12 uses a dedicated main control unit, a dedicated transmitter/receiver for detection, and various sensors, it has a problem of high development cost and installation cost.

On the other hand, a femtocell is a base station, even if it is small, it has a communication function such as a receiving function and a transmitting function. The communication function, however, has been merely intended for communicating with a cellular phone and has not been considered being applied to other uses. The present inventor has come to realize a method for constructing a low-priced security system that uses a femtocell, which is expected to be put on the market and prevailed, as a security sensor in order to solve the above-described problems.

Then, an object of the present invention is to provide a security technique (a base station and a mobile terminal that function as security apparatuses) for easily guarding a building such as a house for an average family or a small office at a low price by using a cellular phone terminal and a small base station (femtocell).

Solution to Problem

In order to solve the above-described problems, the base station according to the first aspect of the present invention is a base station of a mobile communication system placed in a building, including: a communication unit for communicating with the mobile communication system via a communication line; an obtaining unit for obtaining an opened state of a fitting from the fitting or a switch placed near the fitting, wherein the fitting is set to an opening of the building and the switch is for detecting the opened state of the fitting; a registering unit for registering information on a mobile terminal that uses the base station (terminal ID, cellular phone number, and the like of the mobile terminal); a processing unit for processing location registration of the mobile terminal; and a control unit for controlling the communication unit to transmit a predetermined message to a predetermined addressee (the cellular phone number of a mobile terminal or an address of a PC) via the communication line if information received from the mobile terminal (terminal ID, cellular phone number, and the like of the mobile terminal) does not match the information registered in the registering unit when the location registration of the mobile terminal is performed by the processing unit after the opened state of the fitting is obtained by the obtaining unit.

The base station according to the second aspect of the present invention has the processing unit reject the location registration of the mobile terminal if information received from the mobile terminal (mobile terminal terminal ID, cellular phone number, and the like) does not match the information on the mobile terminal registered in the registering unit when the location registration of the mobile terminal is performed by the processing unit.

The base station according to the third aspect of the present invention has a plurality of the switches, each of which is allocated with a security level, and the predetermined message is according to the security level allocated to the switch for which the opened state is obtained.

The base station according to the fourth aspect of the present invention is a base station of a mobile communication system placed in a building, including: a communication unit for communicating with the mobile communication system via a communication line; a transmitting unit for transmitting an identifier of the self base station to a fitting (window, door, or the like) set to an opening (window frame, door frame, or the like) of the building or a switch placed near the fitting for detecting an opened state of the fitting; an obtaining unit for obtaining the opened state of the fitting from the switch; a registering unit for registering information on a mobile terminal that uses the base station (terminal ID, cellular phone number, and the like of the mobile terminal); a processing unit for processing location registration of the mobile terminal; and a control unit for determining whether an identifier of the base station included in the information received from the mobile terminal (network address, cell ID, or the like) matches the identifier of the self base station or not if information received from the mobile terminal (terminal ID, cellular phone number, and the like of the mobile terminal) does not match the information registered in the registering unit when the location registration of the mobile terminal is performed by the processing unit after the opened state of the fitting is obtained by the obtaining unit, and controlling the communication unit to transmit a message according to the determination result to a predetermined addressee via the communication line.

The base station according to the fifth aspect of the present invention is a base station of a mobile communication system placed in a building, including: a transmitting unit for transmitting an identifier of the self base station to a fitting (window, door, or the like) set to an opening of the building (window frame, door frame, or the like) or a switch placed near the fitting for detecting an opened state of the fitting and transmitting information to a mobile terminal via the fitting by using human body communication; an obtaining unit for obtaining the opened state of the fitting from the opening or the fitting; a registering unit for registering information on the mobile terminal that uses the base station (terminal ID, cellular phone number, and the like of the mobile terminal); a processing unit for processing location registration of the mobile terminal; and a control unit for controlling the communication unit to transmit a predetermined message to a predetermined addressee (the cellular phone number of a mobile terminal or an address of a PC) via the communication line if information received from the mobile terminal (terminal ID, cellular phone number, and the like of the mobile terminal) does not match the information registered in the registering unit and an identifier of the base station is not included in the information received from the mobile terminal when the location registration of the mobile terminal is performed by the processing unit after the opened state of the fitting is obtained by the obtaining unit.

The mobile terminal according to the sixth aspect of the present invention includes: a switch placed near a fitting (window, door, or the like) for detecting an opened state of the fitting; a human body communication unit that can communicate via the fitting by using human body communication; a storage unit for storing an identifier of a base station received by the human body communication unit from the fitting; and a control unit for performing location registration via the base station, wherein the control unit controls the mobile terminal to transmit information that can identify the mobile terminal or a contractor of the mobile terminal and the identifier of the base station that is stored in the storage unit to the base station when the location registration is performed.

Although the solutions according to the present invention have been described as apparatuses (a base station and a mobile terminal), it should be understood that the present invention can also be realized as a method, a program, and a storage medium that records the program all of which substantially correspond to the apparatuses and are included in the scope of the present invention.

Advantageous Effects on Invention

According to the present invention, a security system can be constructed at a low price by using a small base station (femtocell) and a mobile terminal (such as a cellular phone terminal).

BRIEF DESCRIPTION OF DRAWINGS

FIG. 3 is a diagram showing a table including information on a connectable terminal that the femtocell has;

DESCRIPTION OF EMBODIMENTS

Embodiments of the present invention will be described below in detail with reference to the drawings.

Figure 1:
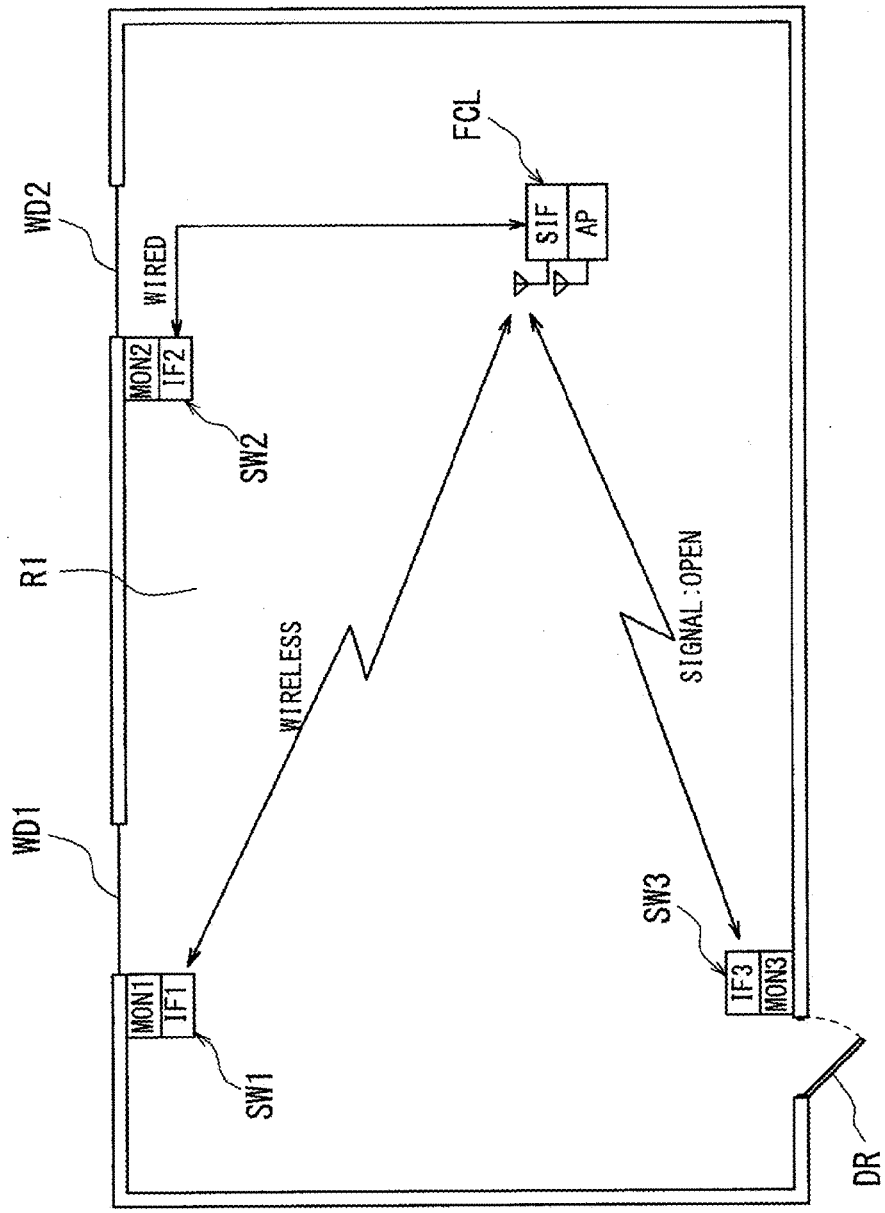
FIG. 1 is a block diagram of a security system that uses a femtocell (small base station) according to an embodiment of the present invention.

FIG. 1 is a block diagram of a security system that uses a femtocell (small base station) according to an embodiment of the present invention. As shown in the figure, the building has a living room (room) R1, and has a first switch SW1, a second switch SW2, and a third switch SW3 for detecting an opened state and a closed state of openings of the building set to two windows WD1 and WD2 and a door DR1, which are the openings of the building. The first switch SW1 has an open-close detecting unit MON1 for detecting an opened state and a closed state of the window WD1, and an interface unit IF1 for transmitting signals including the detected opened state or closed state (for example, a signal "OPEN", or the like) to a femtocell (a femtocell access point, a base station) FCL, or receiving signals including a unique femtocell AP (access point) number from the femtocell FCL. The second switch SW2 and a third switch SW3 also have open-close detecting units MON2 and MON3 and interface units IF2 and IF3 with the same functions as those described above, respectively.

As such, the first to third switches SW1 to SW3 are set to the "door, window and the like", i.e., fittings, which are set to the openings that may be accesses to the building, and mechanically or optically detect opening of the door, the window or the like. Each of the first to third switches SW1 to SW3 can also transmit a signal "OPEN" indicating that the door, window or the like is opened to the femtocell FCL by wire or wirelessly. In the case shown in the figure, the third switch SW3 detects that the door DR is opened and wirelessly transmits the signal "OPEN" to the femtocell FCL. The femtocell FCL receives the signal "OPEN" transmitted from the third switch SW3.

Figure 2:
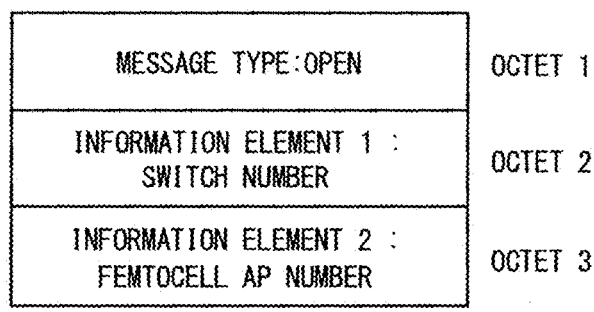
FIG. 2 is a format diagram of a signal "OPEN" transmitted from a switch to a femtocell.

FIG. 2 is a format diagram of the signal "OPEN" transmitted from the switch to the femtocell. As shown in the figure, the signal "OPEN" has a number unique to the femtocell (hereinafter referred to as "femtocell AP number") as an information element 2 and also a number for identifying the switch (hereinafter referred to as "switch number") as an information element 1 to associate the switch with the femtocell.

FIG. 3 is a diagram showing a table including information on connectable terminals (mobile terminals that use the femtocell) that the femtocell has. As shown in the figure, the mobile terminals (cellular phone terminals) AT1 and AT2 are registered in the table TB1 with each terminal associated with information including a terminal ID, a cellular phone number, a contractor name, and a model. In order to operate as a general macro cell base station, the femtocell FCL can also register the location of the neighboring "cellular terminal" of the other person (other than a registered person) with the femtocell FCL. The femtocell FCL includes a memory area (storage unit) having an area for storing a femtocell AP number and connectable terminals (group registered terminals) that are previously registered in the femtocell and keeping therein information in the table TB1 shown in FIG. 3. In the storage unit, information on a predetermined addressee such as a cellular phone number, a fixed phone number, and an electric mail address; the content of a predetermined warning message such as "an intruder is detected"; and the like are previously stored. Although the example shows a case in which only the cellular phones contracted in the name of "Mr. Yamada" are registered for simplicity of the description, the cellular phone number, the terminal ID, the name and the like of persons who enter a resident where the Yamada family live (a building where the femtocell is set) including the family members of Mr. Yamada, acquaintances and friends of Mr. Yamada may be registered.

Figure 4:
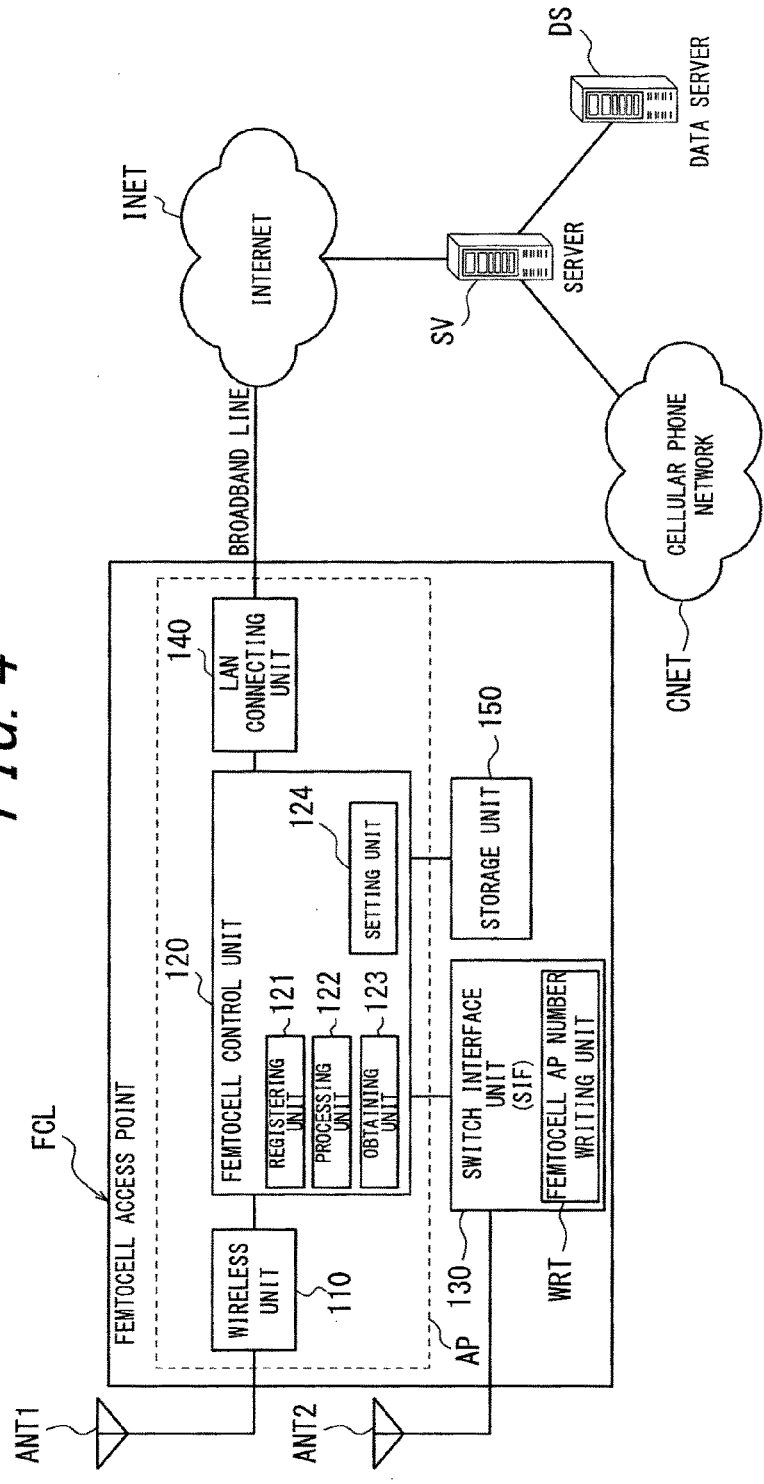
FIG. 4 is a block diagram of the femtocell shown in FIG. 1.

FIG. 4 is a block diagram of the femtocell shown in FIG. 1. As shown in the figure, the femtocell FCL has a wireless unit 110 for communicating with the cellular phone terminal; a femtocell control unit 120 for controlling the entire of the apparatus; a LAN connecting unit (communication unit) 140 for connecting with a broadband line (communication line) for connecting with the Internet INET; a switch interface unit 130 for obtaining signals from each switch (such as a signal indicating an opened state of the door) and, being triggered by the signal, causing the femtocell to function as a security apparatus; a storage unit 150 for saving various types of setting information; an antenna ANT1 for transmitting and receiving radio waves that are communicated with the cellular phone terminal; and an antenna ANT2 for receiving signals from each of the switches SW1 to SW3. The LAN connecting unit 140 is connecting to and communicating with a data server DS or a cellular phone network (mobile communications network, mobile communication system) CNET via the Internet INET, a server SV, or the like.

The femtocell control unit 120 has a registering unit 121 for registering information on the user of at least one of the mobile terminals (cellular phone terminals) that use the femtocell FCL; a processing unit 122 for processing location registration of the mobile terminal; an obtaining unit 123 for obtaining a message from the switch via the switch interface unit 130; and a setting unit 124. The registering unit 121 is registered with information on the user of at least one of the mobile terminals that wirelessly use the femtocell FCL (identification information such as the cellular phone number, the terminal ID, and the like). The registered information is also stored in the storage unit 150. The setting unit 124 sets whether or not to operate the security function of the femtocell according to the present invention. Preferably, for example, the security function is operated when the mobile terminals registered in the registering unit 121 are not present at all in a wireless area covered by the femtocell.

The switch interface unit (SIF) 130 has a femtocell AP number writing unit WRT. The switch interface unit 130 has the femtocell AP number unique to the self base station transmitted to the switches SW1 to SW3 wirelessly via the antenna ANT2 or via a wire, and further has the unique femtocell AP number stored in the mobile terminal AT via the switches SW1 to 3, the fittings such as the door DR and windows WD1 and WD2, and a human body.

Figure 5:
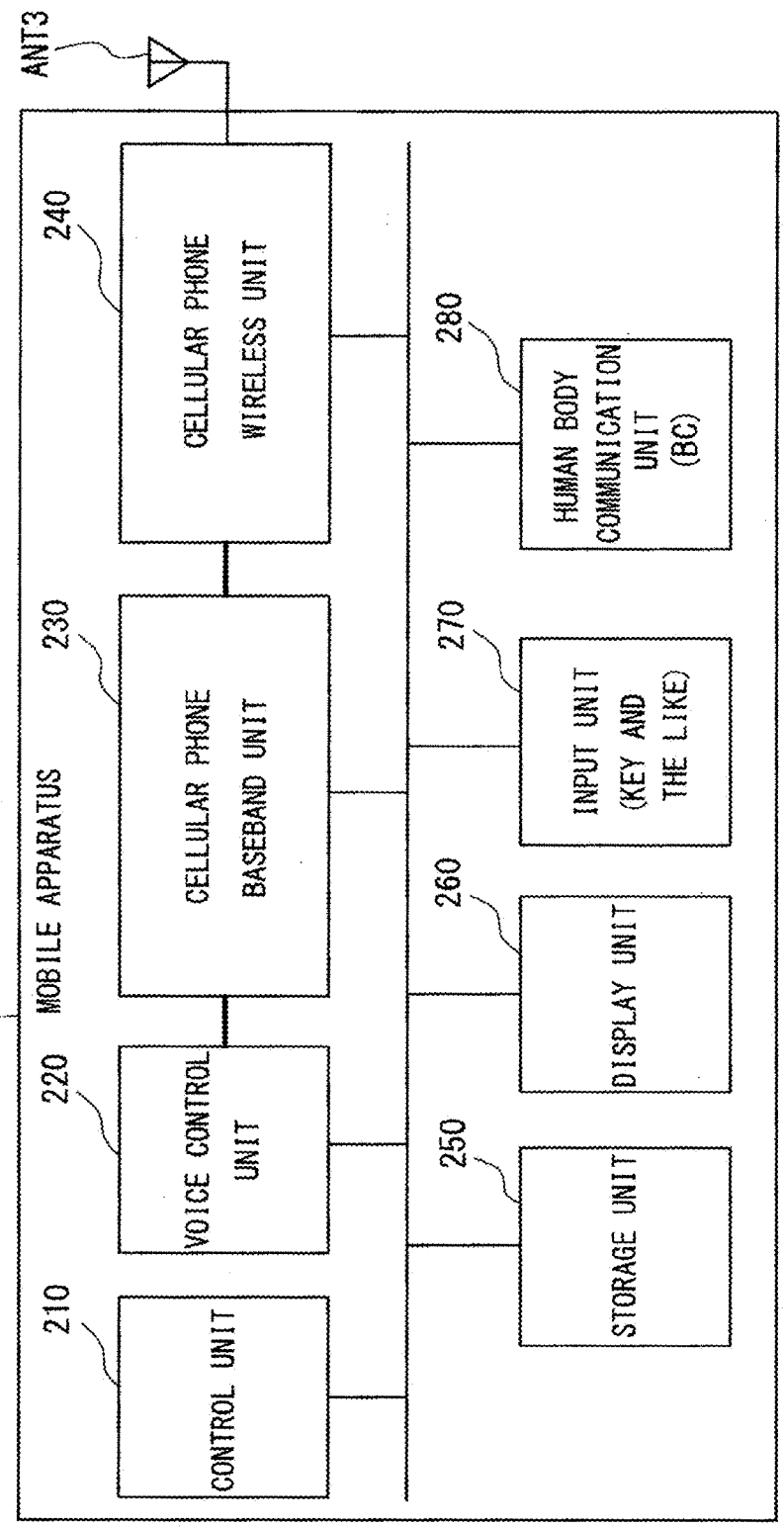
FIG. 5 is a block diagram of a mobile terminal according to an embodiment.

FIG. 5 is a block diagram of the mobile terminal (cellular phone terminal) according to an embodiment. As shown in the figure, the mobile terminal AT has a control unit 210 that controls over the entire of the terminal (for example, a CPU and the like); a voice control unit 220; a cellular phone baseband unit 230; a cellular phone wireless unit 240; an antenna ANT3; a storage unit 250; a display unit 260; an input unit (key, button and the like) 270; and a human body communication unit 280. The human body communication unit 280 communicates with the fittings, i.e., external apparatuses, more specifically the switches SW1 to SW3 that set to the fittings or the openings provided for the fittings and function as open-close monitoring units by using the casing of the mobile terminal AT and a human body which is a conductor as a wire. Although a high voltage is applied for the human body communication, since it is low current, it influences a health of the human body little. In the human body communication, the data can be transmitted and received without any problem, when the human body (typically a hand or a finger) touches a door knob or a window, i.e., the fittings, over gloves and clothes.

Now, a guarding technique for making at least a terminal (mobile terminal) that is contracted by the user connectable to the femtocell and detecting wireless connection of a terminal of a person other than the user (other than a registered person) to the femtocell or guarding the building in which the femtocell is placed by using switches set to openings of the building, the fittings set at the openings, or neighbor of the openings and fittings will be described with reference to FIG. 6, FIG. 7, and FIG. 8 as a first embodiment.

Figure 6:
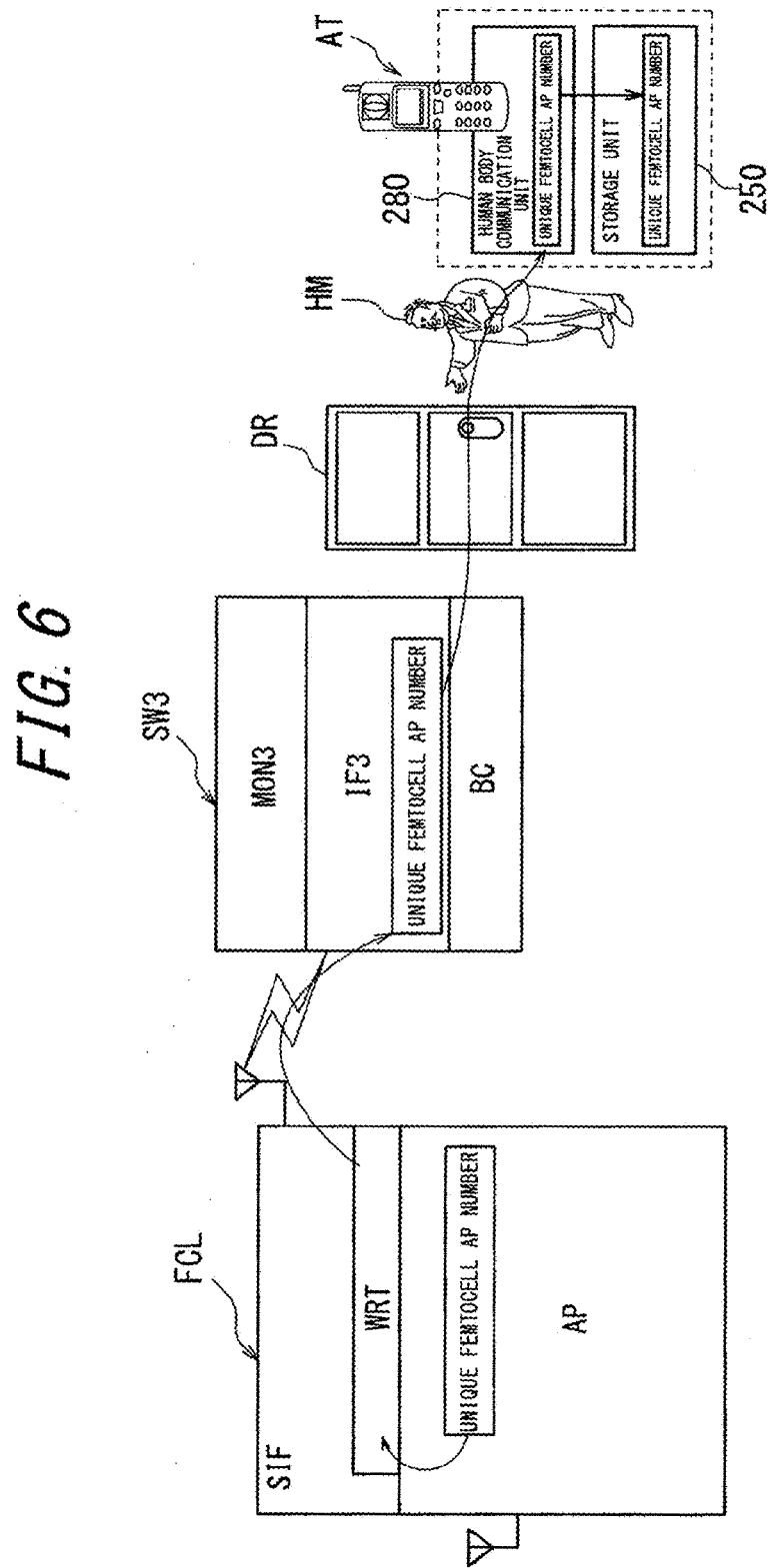
FIG. 6 is a diagram for illustrating a process of writing a unique femtocell AP number from a femtocell FCL to a mobile terminal AT via a switch SW3 by human body communication in the security system according to an embodiment.

FIG. 6 is a diagram for illustrating a process of writing the unique femtocell AP number from the femtocell FCL to the mobile terminal AT via the switch SW3 by the human body communication in the security system according to an embodiment. While the process is described by taking the third switch SW3 as an example, the security system functions in the same manner as the other switches are used. As shown in the figure, when the femtocell FCL receives from the third switch SW3 the signal "OPEN" indicating that the human body HM touches the door DR and opens the door DR, the femtocell FCL causes the femtocell AP number writing unit WRT provided in the switch interface unit SIF to wirelessly transmit the unique femtocell AP number to the third switch SW3, which is the signal "OPEN" source, and write (store) the number in the switch SW3. The human body communication unit 280 of the third switch SW3 receives "the unique femtocell AP number" from the interface unit IF3 and transmits the information to the human body communication unit 280 in the mobile terminal AT via a part of the door DR that is a conductor, a part of the human body HM, and other interposition (clothes, gloves and the like). The human body communication unit 280 of the mobile terminal AT stores the information of "the unique femtocell AP number" in the storage unit 250. The stored "unique femtocell AP number" is used in the location registration. Alternatively, the third switch SW3 may obtain "the unique femtocell AP number" from the femtocell FCL and store in the storage unit (not shown) in advance.

First Embodiment

Figure 7:
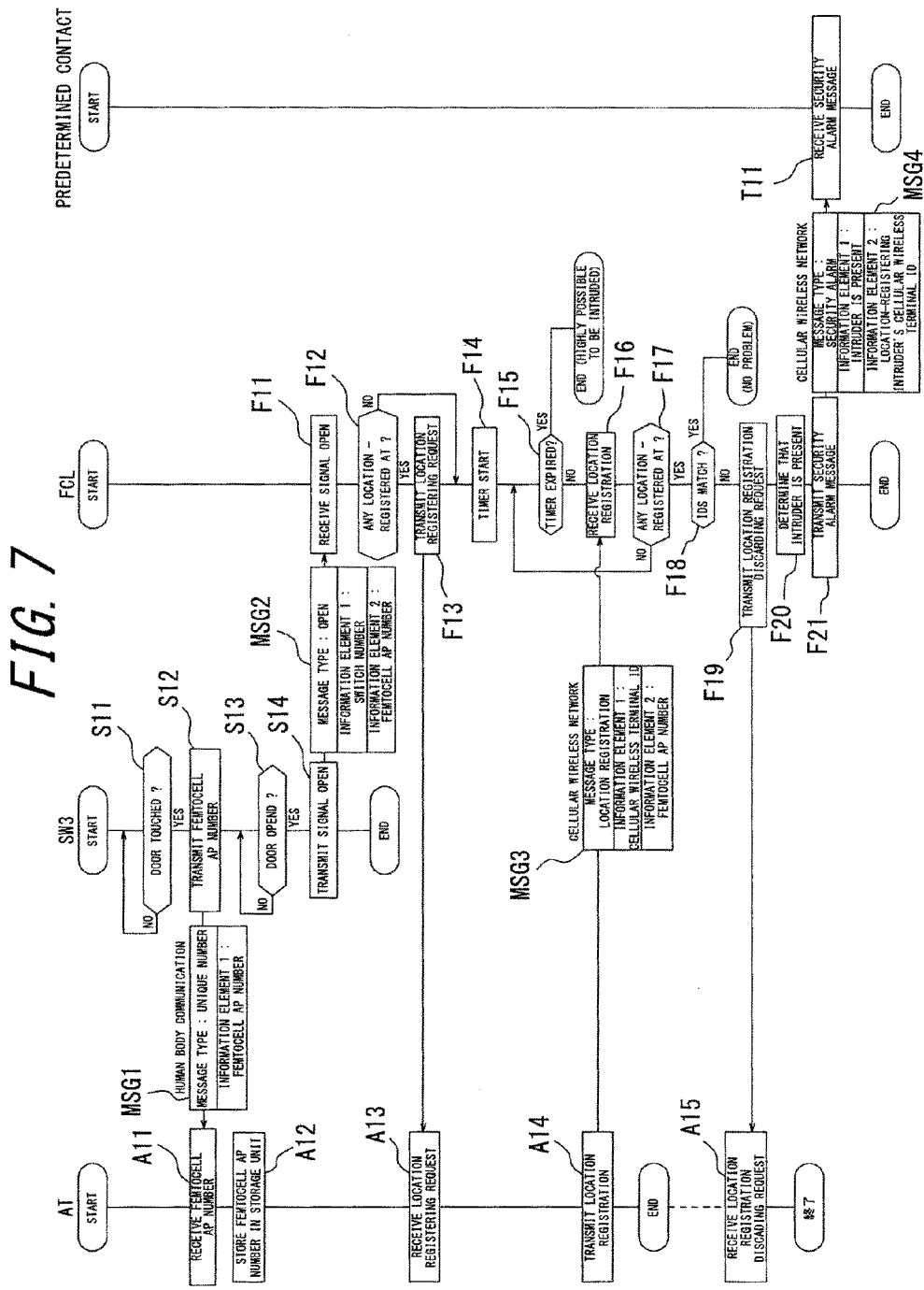
FIG. 7 is a sequence chart of processes according to a first embodiment.

FIG. 7 is a sequence chart of processes according to a first embodiment. It is assumed that apparatuses and configurations shown in FIGS. 1 to 6 are used in the first embodiment. FIG. 7 shows processes of the mobile terminal AT, the switch SW3, the femtocell FCL, and a predetermined addressee terminal in time series. Although the embodiments shown below exemplify the switch SW3, it should be noted that the security system can be configured with the other switches in the same manner.

<Process of Switch SW3>

At step S11, the switch SW3 waits for the door DR, the monitor object, to be touched. When the door DR is touched, the switch SW3 transmits a message MSG1 including the femtocell AP number via the door DR by the human body communication at step S12. The message MSG1 is that transmitted by the human body communication, and includes "the unique number" as the message type and "the femtocell AP number" as the information element 1. At step S13, the switch SW3 is waiting for the door DR to be opened. When the door DR is opened, the switch SW3 transmits a message MSG2 indicating the signal "OPEN" to the femtocell FCL at step S14. The message MSG2 includes "OPEN" as the message type, "the switch number" as the information element 1, and "the femtocell AP number" as the information element 2. Since the process of the switch SW3 has been finished, the operation returns to step S11 where the switch SW3 waits for the door DR to be touched.

<Process of Mobile Terminal AT>

The mobile terminal AT is the mobile terminal (cellular phone terminal) carried by a person who has touched the door DR. At step A11, the mobile terminal AT receives the message MSG1 that includes the femtocell AP number by the human body communication. At step A12, the mobile terminal AT causes the storage unit to store the received femtocell AP number. At step A13, the mobile terminal AT receives a location registering request. After receiving the request, the mobile terminal AT transmits location registration and a message MSG3 to the femtocell FCL at step A14, and temporarily finishes the process. In some cases, such as if the femtocell FCL rejects the location registration, the mobile terminal AT receives a location registration discarding request and finishes the process at step A15. The message MSG3 includes "the location registration" as the message type, "the cellular wireless terminal ID" as the information element 1, and "the femtocell AP number" as the information element 2.

<Process of Femtocell FCL>

At step F11, the femtocell FCL receives a message MSG2 indicating the signal "OPEN". At step F12, the femtocell FCL determines whether any mobile terminal AT has registered for the location therewith or not. When a mobile terminal AT has registered for the location therewith, the mobile terminal AT may have registered for the location therewith before the signal "OPEN" is received. Therefore, at step F13, the femtocell FCL transmits "the location registering request" to the mobile terminal AT.

After transmitting the location registering request at step F13, or if the condition is not satisfied at step F12, the femtocell FCL starts a timer at step F14. At step F15, the femtocell FCL checks whether the timer has expired or not. If the timer has expired, the femtocell FCL determines that it is highly possible to be intruded and finishes the processes. When the timer has not expired, the femtocell FCL tries to receive the location registration from the mobile terminal AT at step F16. At step F17, the femtocell FCL determines whether any mobile terminal AT has registered for the location therewith or not. If no mobile terminal AT has registered for the location therewith, the operation returns to step F15.

When it is determined that the mobile terminal AT has registered for the location therewith at step F17, the operation proceeds to step F18 and the femtocell FCL determines whether the ID of the location-registered mobile terminal AT and the ID that has been previously registered to the femtocell FCL match or not. If the IDs match, the femtocell FCL takes that there is no problem and finishes the processes. When the IDs do not match, the femtocell FCL transmits a location registration discarding (rejection) request to the mobile terminal AT at step F19. At step F20, the femtocell FCL determines that "an intruder is present". Then at step F21, the femtocell FCL transmits a message MSG4 indicating the security alarm to the predetermined addressee (such as cellular phone terminal or PC) via the broadband line, the Internet, the cellular phone network and the like, and finishes the processes. The message MSG4 includes the security alarm as the message type, that "an intruder is present" as the information element 1, and "the location-registering intruder's cellular wireless terminal ID" as the information element 2.

<Predetermined Addressee>

At step T11, the predetermined addressee (such as cellular phone terminal or PC) receives the message MSG4 that indicates the security alarm. Information on the predetermined addressee includes the cellular phone terminal number, PC address (electronic mail address, IP address) and the like that are stored (described) in the storage unit 150 of the femtocell FCL. Although not shown, the terminal or PC of the predetermined addressee alarms the user thereof by causing a display unit thereof to display the content included in the received message MSG4, causing a light unit thereof to flicker, causing a vibration unit thereof to vibrate, or causing an audio unit thereof to read out the content.

If it is determined that the mobile terminal AT has been previously registered to the femtocell FCL (IDs match) in FIG. 7 accordingly (step F18), the location registration transmitted at step A14 has succeeded and the process finishes. If it is determined that the mobile terminal AT has not been previously registered to the femtocell FCL (IDs do not match) (step F18), the steps by the femtocell FCL starting at step F19 and step T11 by the predetermined addressee are executed and the security alarm (message) is given to the predetermined addressee.

Second Embodiment

Figure 8:
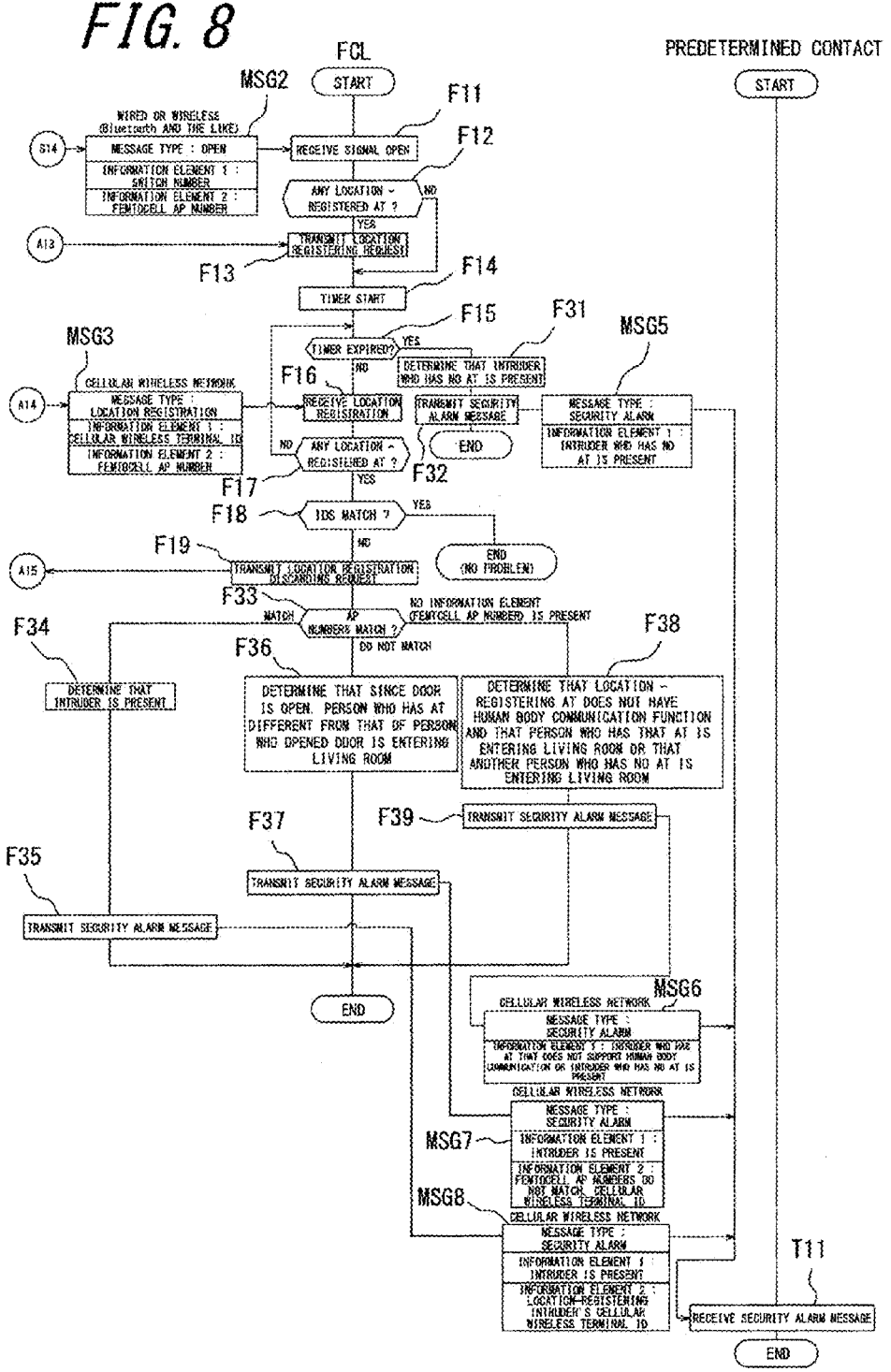
FIG. 8 is a sequence chart of processes according to a second embodiment.

FIG. 8 is a sequence chart of processes according to a second embodiment. FIG. 8 shows processes of the femtocell FCL and the predetermined addressee (cellular phone terminal or PC) in time series. Although the processes of the mobile terminal AT and the switch SW3 are performed in time series as they are described in FIG. 7, they are not shown in FIG. 8 for simplicity of the drawing and description.

<Process of Femtocell FCL>

The process from steps F11 to F19 is the same as that described in the first embodiment. If the timer has expired at step F15, the operation proceeds to step F31 where the femtocell FCL determines that an intruder who has no mobile terminal AT is present. Then at step F32, the femtocell FCL transmits a message MSG5 indicating the security alarm message to the predetermined addressee (such as cellular phone terminal or PC) via the broadband line, the Internet, the cellular phone network and the like. The message MSG5 includes "the security alarm" as the message type and that "an intruder who has no mobile terminal AT is present" as the information element 1.

After performed step F19, the femtocell FCL determines whether "the femtocell AP number" included as an information element of the location registration transmitted from the mobile terminal AT matches with the femtocell AP number thereof or not, or whether "the femtocell AP number" is included as an information element or not. If the femtocell AP numbers match, the femtocell FCL determines that an intruder is present at step F34, and transmits a message MSG8 indicating the security alarm to the predetermined addressee (such as cellular phone terminal or PC) via the broadband line, the Internet, the cellular phone network and the like at step F35. The message MSG8 includes "the security alarm" as the message type, that "an intruder is present" as the information element 1, and that "location-registering intruder's cellular wireless terminal ID" as the information element 2.

When it is determined that the femtocell AP numbers do not match at step F33, the femtocell FCL determines that "since the door is open, another person who has the mobile terminal AT different from that of the person who opened the door is entering the living room" at step F36. Then at step F37, the femtocell FCL transmits a message MSG7 indicating the security alarm to the predetermined addressee (such as cellular phone terminal or PC) via the broadband line, the Internet, the cellular phone network and the like. The message MSG7 includes "the security alarm" as the message type, that "an intruder is present" as the information element 1, and "the location-registering intruder's cellular wireless terminal ID" as the information element 2.

When it is determined that "the femtocell AP number" is not included as an information element at step F33, the femtocell FCL determines that "location-registering mobile terminal AT does not have a human body communication function and that person who has such a mobile terminal AT is entering the living room or that another person who has no mobile terminal AT is entering the living room" at step F38. Then at step F39, the femtocell FCL transmits a message MSG6 indicating the security alarm to the predetermined addressee (such as cellular phone terminal or PC) via the broadband line, the Internet, the cellular phone network and the like. The message MSG6 includes "the security alarm" as the message type, and that "an intruder who has a mobile terminal AT that does not support human body communication is present or an intruder who has no mobile terminal AT is present" as the information element 1.

<Predetermined Addressee>

At step T11, the predetermined addressee (such as cellular phone terminal or PC) receives any of the messages MSG6, 7, and 8 indicating the security alarm. Although not shown, the terminal or PC of the predetermined addressee alarms the user thereof by causing a display unit thereof to display the content included in the received message MSG6, 7, or 8, or causing an audio unit thereof to read out the content.

Third Embodiment

Figure 9:
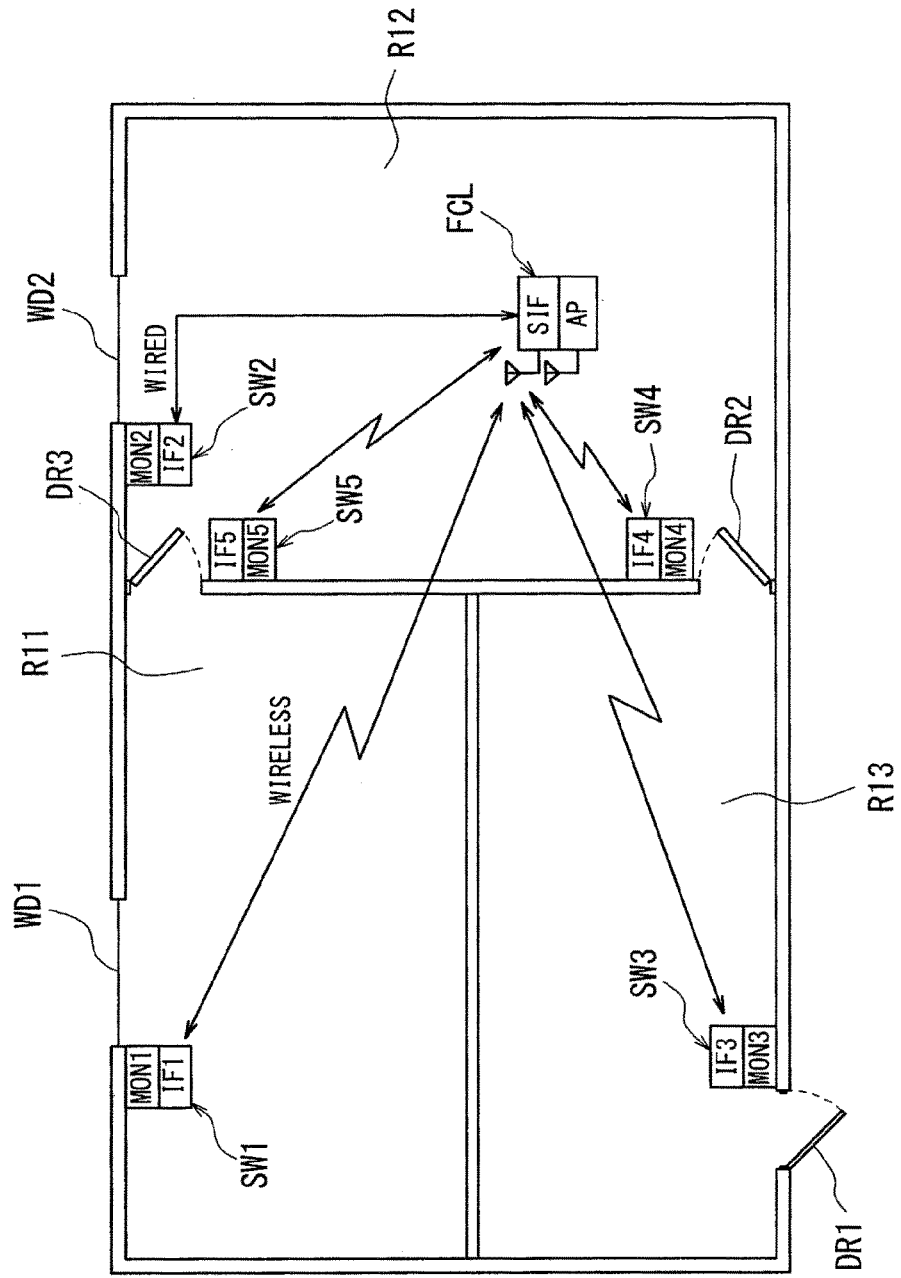
FIG. 9 is a block diagram of a security system that uses the femtocell according to a third embodiment.

FIG. 9 is a block diagram of a security system that uses the femtocell (small base station) according to the third embodiment of the present invention. As shown in the figure, the building has three living rooms (rooms) R11, R12 and R13, and has the first switch SW1, the second switch SW2, and the third switch SW3 for detecting an opened state and a closed state of openings of the building set to two windows WD1 and WD2 and a door DR1, which are the openings of the building. In the third embodiment, a door DR2 is set to the opening between the living room R12 and the living room R13 and a door DR3 is set to the opening between the living room R12 and the living room R11. The door DR2 and the door DR3 are provided with a fourth switch SW4 and a fifth switch SW5 for detecting the opened state and the closed state of the openings, respectively.

The first to the third switches SW1 to 3 have the open-close detecting units MON1-3 and the interface units IF1-3, respectively, as those described in the first embodiment. The fourth and the fifth switches SW4 and SW5 have open-close detecting units MON4 and MON5 and interface units IF4 and IF5, respectively. In the third embodiment, the security level is set to each living room. Since an important thing is kept in the living room R12, a high security level is set to the living room R12; while a standard (medium) security level is set to the living rooms R11 and R13. In the third embodiment, a security message including the content according to the security level can be transmitted. Thus, according to the security level set to the living room R12, also the high security level is set to the window WD2, the doors DR2 and DR3, which are the openings to the living room R12. If any of the fittings are opened and predetermined conditions are satisfied, a much more urgent or critical security message is transmitted to the predetermined addressee.

Figure 10:
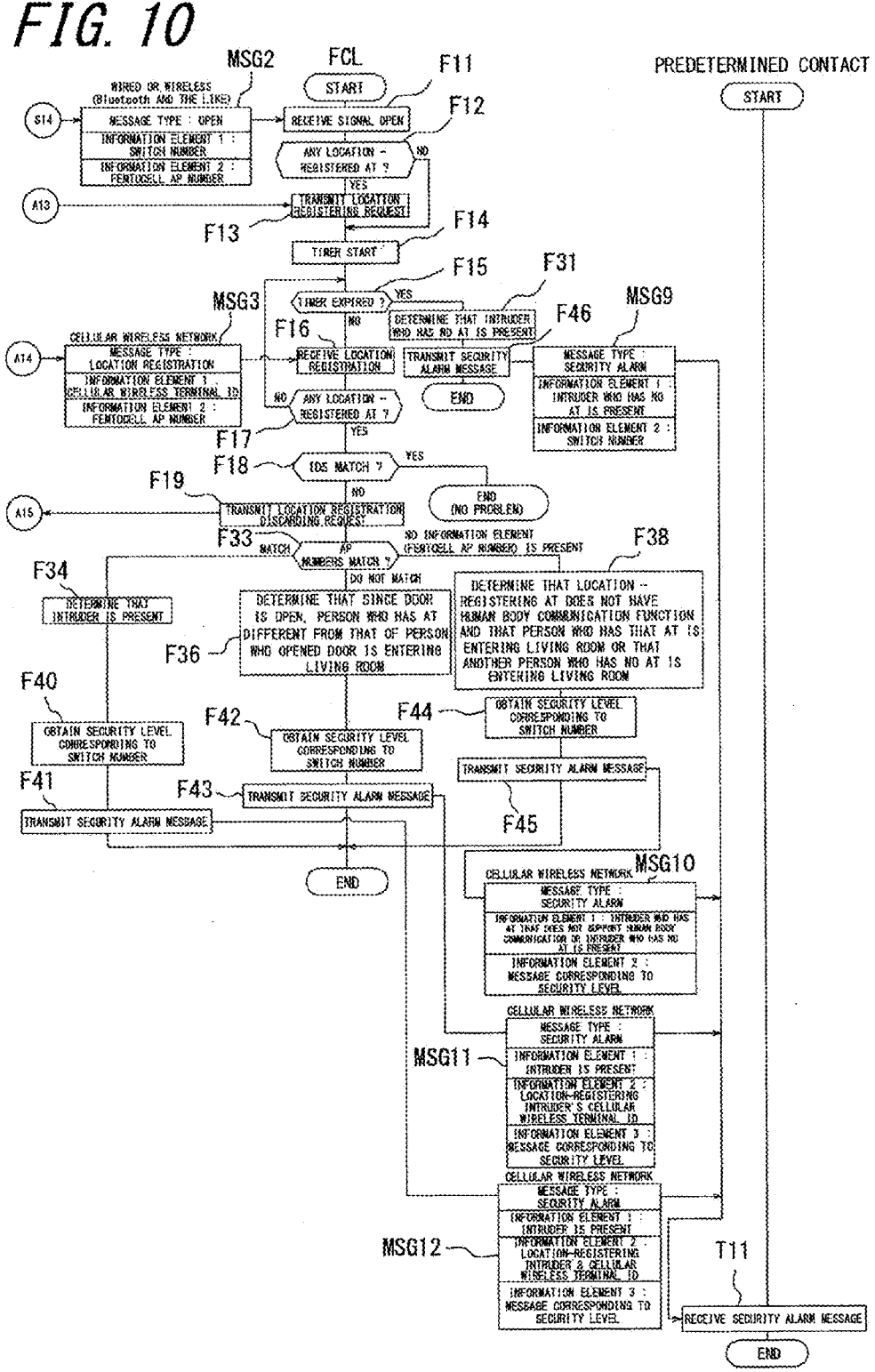
FIG. 10 is a sequence chart of processes according to the third embodiment.
Figure 11:
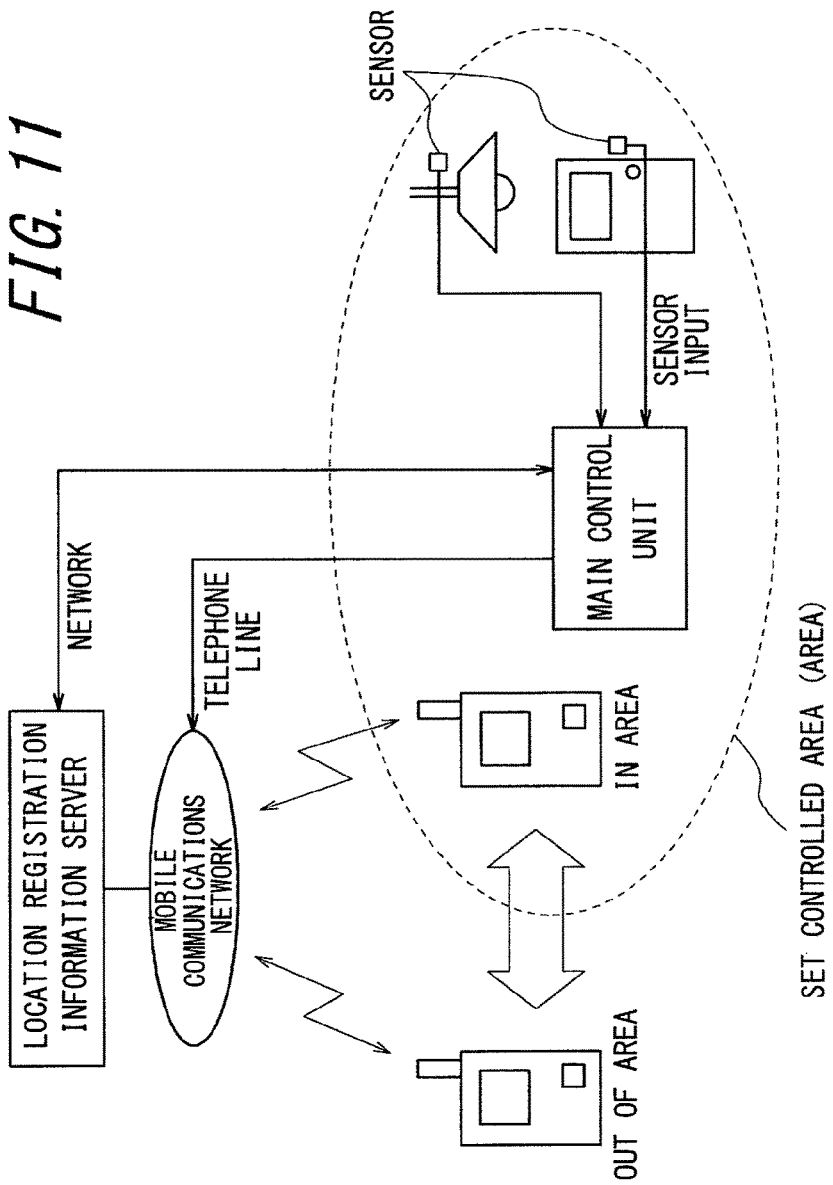
FIG. 11 shows a block diagram of the security system according to a conventional art.
Figure 12:
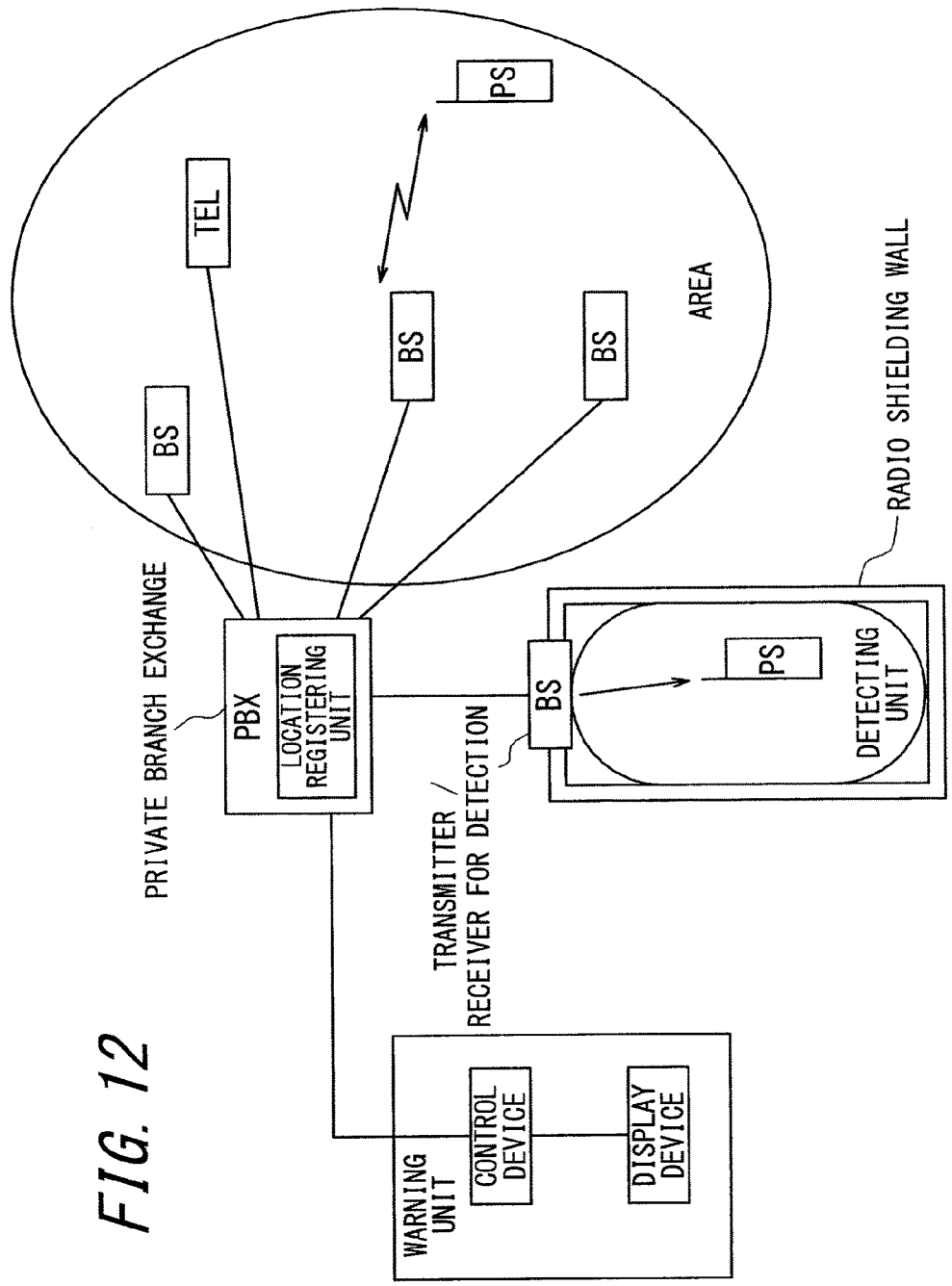
FIG. 12 shows a block diagram of the security system according to a conventional art.

FIG. 10 is a sequence chart of processes according to the third embodiment. FIG. 10 shows processes of the femtocell FCL and the predetermined addressee (cellular phone terminal or PC) in time series. Although the processes of the mobile terminal AT and the switch SW3 are performed in time series as they are described in FIG. 7, they are not shown in FIG. 10 for simplicity of the drawing and description.

<Process of Femtocell FCL>

The process from steps F11 to F19 is the same as those described in the first and second embodiments. If the timer has expired at step F15, the operation proceeds to step F31 where the femtocell FCL determines that an intruder who has no mobile terminal AT is present. Then at step F46, the femtocell FCL transmits a message MSG9 indicating the security alarm message to the predetermined addressee (such as cellular phone terminal or PC) via the broadband line, the Internet, the cellular phone network and the like. The message MSG9 includes "the security alarm" as the message type, that "an intruder who has no mobile terminal AT is present" as the information element 1, and "switch number" as the information element 2. Since the predetermined addressee can obtain information of the switch number, the addressee can recognize which living room of the house or office is intruded. The predetermined addressee can also easily recognize how much influence the intrusion to the room has so that the addressee can determine which of the agencies such as the police and the security company to call out based on the switch number.

The process at steps F33, F34, F36, and F38 is the same as that described in the second embodiment. After performed step F34, the femtocell FCL obtains the security level corresponding to the switch number included in the message MSG2 at step F40. Similarly, after performed steps F36 and F38, the femtocell FCL obtains the security levels corresponding to the switch numbers included in the message MSG2 at steps F42 and F44, respectively. A table shown below is stored in the storage unit in advance so that the table is referred to and the security level is obtained.

TABLE 1

| | Security level | Switch location |
|---|---|---|
| Switch SW1 | Medium | Between R11 and outside |
| Switch SW2 | High | Between R12 and outside |
| Switch SW3 | Medium | Between R13 and outside |
| Switch SW4 | High | Between R12 and R13 |
| Switch SW5 | High | Between R11 and R12 |

For example, in the embodiment, when the door DR1 is opened, a message including the security level "medium" associated with the switch SW3 set near the door DR1 is transmitted, and then, when the door DR2 is opened, a message including the security level "high" associated with the switch SW4 is transmitted.

Returning to the description with reference to FIG. 10, at steps F41, F43, and F45, messages MSG12, 11, and 10 indicating the security alarm are transmitted, respectively, and the process ends. The message MSG12 includes "the security alarm" as the message type, that "an intruder is present" as the information element 1, that "location-registering intruder's cellular wireless terminal ID" as the information element 2, and "information according to the security level" as the information element 3.

The message MSG11 includes "the security alarm" as the message type, that "an intruder is present" as the information element 1, that "location-registering intruder's cellular wireless terminal ID" as the information element 2, and "information according to the security level" as the information element 3. The message MSG10 includes "the security alarm" as the message type, that "an intruder who has a mobile terminal AT that does not support human body communication is present or an intruder who has no mobile terminal AT is present" as the information element 1, and that "information according to the security level" as the information element 2. For example, in the case in which the security level is high, the corresponding switch number, the living room number (or the name of the room), the message "Emergency: intruded place: high security area", and the like are included.

Advantages of the embodiments of the present invention will be described again. Although the femtocell has not been put on the market yet in Japan, it is expected to be put on the market for around tens of thousands of yen. Even if a function of communicating with a switch (for example, Bluetooth) is added, the cost will increase by no more than several thousand yen. As for the switch, even if a Bluetooth function and a human body communication function are added as well as the door open-close detecting unit, it will cost no more than ten thousand yen. Therefore, if a person buys a unit of the femtocell and ten switches, for example, the person can have an advanced security system built at a much lower price than the case in which the person rents apparatuses from a security company and contracts with the security company for security services.

Since the switch writes "the femtocell AP number" into the cellular wireless terminal of the person who opened the opening such as a door, a window, and the like by human body communication, and the cellular wireless terminal transmits "the cellular wireless terminal ID" and "the femtocell AP number" to the femtocell as information elements in registering the location to the femtocell, the femtocell can recognize that someone has opened a door, a window, or the like of the house where the femtocell is set and entered the house as well as the specific cellular wireless terminal ID. Since the human body communication is a kind of wired communication by means of "direct touching", the present invention can thoroughly prevent "a cellular phone terminal of a passerby" who has casually passed through the femtocell coverage to have the location of the cellular phone terminal registered accordingly from being mistaken for an intruder's cellular phone terminal. Since it is quite important to avoid malfunction, mistaking, false alarm and the like in the security system, it is quite effective to eliminate "the cellular phone terminal of a passerby" from detection objects by using the human body communication.

While the present invention has been shown and described with reference to the drawings and embodiments thereof, it should be understood by those skilled in the art that various changes and corrections may be readily made based on the teachings of the present disclosure. Therefore, it should be understood that the changes and corrections are included in the scope of the present invention. For, example, functions included in the respective components, means, and steps can be rearranged so as not to logically conflict with each other. The plurality of means and the steps can be combined into one or divided.

REFERENCE SIGNS LIST

| | |
|---|---|
| FCL | femtocell |
| 110 | wireless unit |
| 120 | femtocell control unit |
| 121 | registering unit |
| 122 | processing unit |
| 123 | obtaining unit |
| 124 | setting unit |
| 130 | switch interface unit |
| 140 | LAN connecting unit |
| 150 | storage unit |
| ANT1-ANT3 | antenna |
| SV | server |
| DS | data server |
| INET | Internet |
| CNET | cellular network (mobile communication network) |
| AT | mobile apparatus |
| 210 | control unit |
| 220 | voice control unit |
| 230 | cellular phone baseband unit |
| 240 | cellular phone wireless unit |
| 250 | storage unit |
| 260 | display unit |
| 270 | input unit (key and the like) |
| 280 | human body communication unit |
| DR, DR1-DR3 | door |
| HM | HUMAN BODY |
| IF1-IFS | interface unit |
| MON1-MON5 | open close detecting unit |
| MSG1-MSG12 | message |
| R1, R11-R13 | living room |
| SIF | switch interface unit |
| SW1-SW5 | switch |
| TB1 | table |
| WD1, WD2 | window |
| WRT | femtocell ap number writing unit |

The invention claimed is:

1. A base station of a mobile communication system placed in a building, comprising:
a communication unit for communicating with the mobile communication system via a communication line;
a transmitting unit for transmitting an identifier of the base station to an interface unit, wherein the interface unit is associated with at least one of a fitting set to an opening of the building and a switch placed near the fitting, wherein the switch detects an opened state of the fitting;
an obtaining unit for obtaining the opened state of the fitting from the switch;
a registering unit for registering information on a mobile terminal when the mobile terminal uses the base station for wireless communication;
a processing unit for processing location registration of the mobile terminal; and
a control unit for determining whether an identifier of the base station included in the information received from the mobile terminal matches the identifier of the base station or not if information received from the mobile terminal does not match the information registered in the registering unit when the location registration of the mobile terminal is performed by the processing unit after the opened state of the fitting is obtained by the obtaining unit, and controlling the communication unit to transmit a message according to the determination result to a predetermined addressee via the communication line, wherein the mobile terminal receives the identifier of the base station from the switch.

2. The base station according to claim 1, wherein the processing unit rejects the location registration of the mobile terminal if information received from the mobile terminal does not match the information on the mobile terminal registered in the registering unit when the location registration of the mobile terminal is performed by the processing unit.

3. The base station according to claim 1, wherein the base station has a plurality of the switches, each of which is allocated with a security level, and the predetermined message is according to the security level allocated to the switch for which the opened state is obtained.

4. A base station of a mobile communication system placed in a building, comprising:
a transmitting unit for transmitting an identifier of the base station to an interface unit, wherein the interface unit is associated with at least one of a fitting set to an opening of the building and a switch placed near the fitting, wherein the switch detects an opened state of the fitting, and wherein the transmitting unit is also for transmitting information to a mobile terminal via the fitting by using human body communication;
an obtaining unit for obtaining the opened state of the fitting from the switch;
a registering unit for registering information on the mobile terminal when the mobile terminal uses the base station for wireless communication;
a processing unit for processing location registration of the mobile terminal; and
a control unit for determining whether an identifier of the base station included in the information received from the mobile terminal matches the identifier of the base station or not if information received from the mobile terminal does not match the information registered in the registering unit when the location registration of the mobile terminal is performed by the processing unit after the opened state of the fitting is obtained by the obtaining unit, and controlling the communication unit to transmit a message according to the determination result to a predetermined addressee via the communication line, wherein the mobile terminal receives the identifier of the base station from the switch.

5. A mobile terminal comprising:
a human body communication unit that can communicate by using human body communication;
a storage unit for storing an identifier of a base station received by the human body communication unit from a fitting; and
a control unit for performing location registration via the base station when the mobile terminal uses the base station for wireless communication, wherein the control unit controls the mobile terminal to transmit information that can identify the mobile terminal or a contractor of the mobile terminal and the identifier of the base station that is stored in the storage unit to the base station when the location registration is performed.

* * * * *